Figure 1:
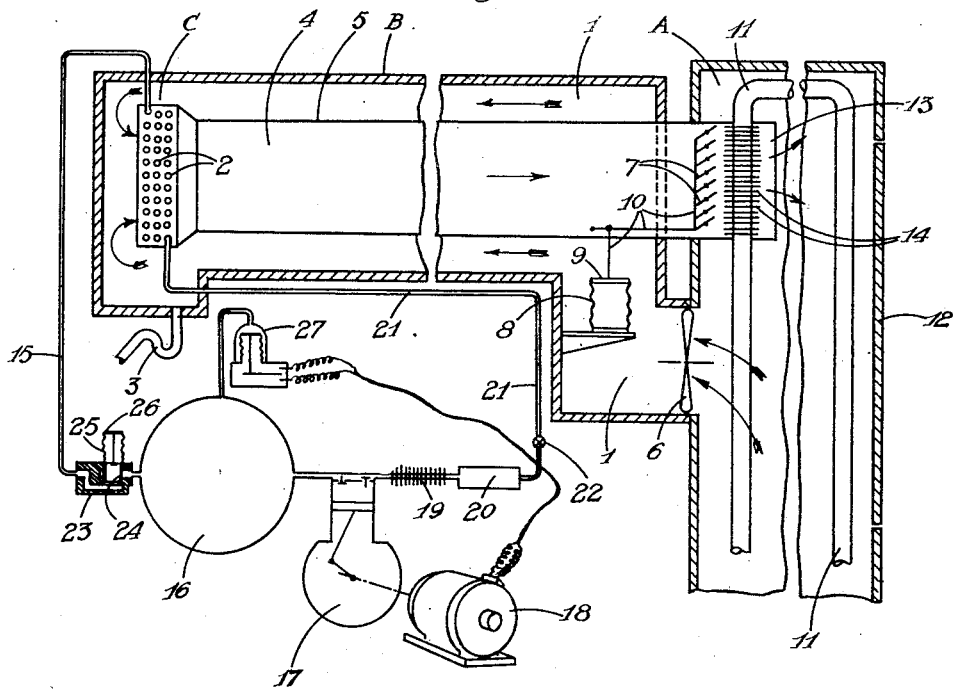

Oct. 18, 1938.    C. E. WAUTELET    2,133,677
AIR CONDITIONING PROCESS
Filed Jan. 9, 1936

C. E. Wautelet
INVENTOR

By Glascock Downing & Seebold
ATTYS.

Patented Oct. 18, 1938

2,133,677

UNITED STATES PATENT OFFICE 2,133,677

AIR CONDITIONING PROCESS

Camille Ernest Wautelet, Woluwe-Saint-Pierre, Brussels, Belgium

Application January 9, 1936, Serial No. 58,428
In Belgium January 19, 1935

4 Claims. (Cl. 62—6)

The present invention relates to a process of conditioning air, i. e., for regulating or maintaining its temperature and its degree of moisture. It is more particularly applicable to cases where the air, in a closed room such as a cold storage room, a public hall, a drying plant, is subjected to variations of temperature and moisture content, which it is desired to keep at predetermined values. It is known, to that end, to withdraw the spent air, i. e., the air that has become heated and moisture laden in the course of its use, and to substitute therefor fresh air, i. e., air that has been previously brought into contact with a source of cold, in which case the same air may continuously be used over again and circulate from the cold source to the room and vice-versa. With such processes, however, it has not been possible until now accurately to effect a suitable conditioning, irrespective of the variations in the temperature and the moisture content to which the air in the room is subjected by extraneous causes.

An object of this invention is to make it possible to realize such conditioning with greater accuracy and reliability than heretofore, a further object being to obtain this result in a very economical manner owing to a rational utilization of part of the heat carried by the spent air.

With these objects in view, I have found that in order to obtain in practice an accurate conditioning of the air in a room it is necessary that the temperature of the air be maintained substantially constant at two determined points of its flow: namely, the lowest temperature $t$ which is that of the air leaving the source of cold, and the highest temperature $T$ to which the air is brought as a result of the heat exchange, at the inlet of the room. The temperature $t$ being equal to that of the source of cold, the latter must be maintained at a substantially constant temperature, in spite of the essentially variable quantity of heat brought by the air to be conditioned to the source of cold. This cannot be obtained by a thermostatic control depending only on the temperature of the air, without taking into account the heat yielded to the source of cold by the condensation of the water vapor carried by the air. Only an automatic control responsive to the total heat yielded to the source of cold, both by the cooling of the air and by the condensation of vapor, enables in all cases the temperature of the source of cold and, consequently, the lowest temperature $t$ of the air to be maintained substantially constant. Moreover, only when the constance of said temperature $t$ is assured, it is possible to obtain, by thermostatic control of the flow of air through a heat exchanger, the constance of the maximum temperature $T$ and of the hygrometric degree of the air subjected to the heat exchange.

The process according to my invention is based on these observations and it also comprises subjecting the air to be conditioned to a preliminary temperature variation in order to bring it, by subsequent heat-exchange, to the temperature and degree of moisture to be kept up in the room, my said process being characterized by making said temperature variation dependent on the total amount of heat carried by the air to be conditioned, thereby bringing said air to a constant and predetermined minimum temperature, and by controlling the flow of air subjected to heat exchange, in function of the temperature in said room, thereby bringing the air at the entrance of said room to a constant and predetermined maximum temperature and a constant and predetermined hygrometric degree.

In some cases, as in the case of a storage room, it is advantageous to circulate the air in a closed circuit and to lead the spent air flowing out of said chamber and the incoming fresh air through a contra-current heat-exchanger. I thus am able to avoid substantial differences between the temperature $T'$ obtaining in the room and the constant temperature $T$ at the entrance to said room. Furthermore the spent air leaves the heat-exchanger at a temperature $t'$ near the temperature $t$ of the cold source so that the expenditure of energy of the latter is kept down to a minimum.

The invention is applicable whatever be the temperature level to be maintained in the room. Two examples of the invention will be described hereafter with reference to the accompanying drawing in which:

Fig. 1 diagrammatically illustrates a plant for conditioning the air in a cold storage room.

Figure 2:
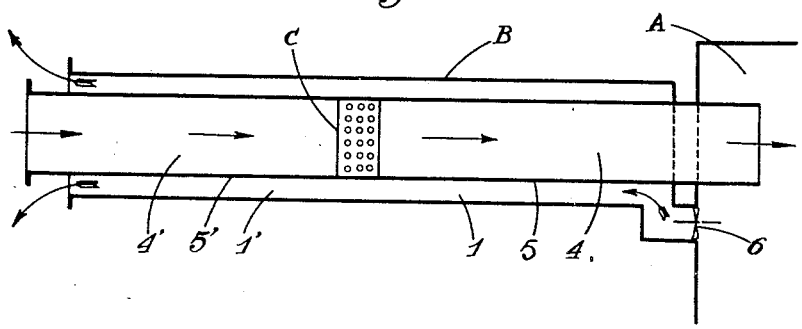

Fig. 2 likewise illustrates a plant for feeding a hall with conditioned air.

In these figures, like parts are denoted by like reference numerals.

Referring to Fig. 1, A is a storage room in which it is desired to keep the air at a temperature and a hygrometric degree which will be substantially uniform and suitable for the preservation of the food products stored in said room. To that end, the air which has become heated and laden with water vapor during its stay in the room A, is withdrawn through a conduit 1 and replaced by air fed through a conduit 4. Before entering the conduit 4, the air on its way to room A is brought into contact with a source of cold C comprising a bundle of tubes 2 containing a refrigerant liquid. The temperature of this liquid is controlled so as to cool the air to a predetermined temperature at which the air can only hold the amount of water vapor which it is to contain subsequently, as it enters chambers A.

In practice, the air brought into contact with the source of cold C is the spent air which has been led away from chamber A through the conduit 1, as shown in Fig. 1. Usually this air carries with it an excess of moisture which it has absorbed in the chamber A. As it is cooled at C, it reaches saturation and then discharges the excess water vapor which condenses and is evacuated through a pipe 3. This condensation water being pure may, in some cases, be collected and made use of.

As it leaves the source of cold C, the air which is cold and saturated with moisture, is led towards the room A through conduit 4 which is separated from conduit 1 by a heat conducting wall 5. The conduits 1 and 4 form together a heat-exchanger B, in which the spent air flowing from A to C, transmits heat to the previously cooled air flowing from C to A. The heat exchanger B is thermally insulated from the outside and is protected from any source of moisture. A fan 6 keeps the air in motion. As it flows through the conduit 4, the air on its way to A is gradually heated at the expense of the air in conduit 1, and at the inlet of chamber A, the incoming air has reached a temperature that is substantially the same as that of the spent air in conduit 1, and thus closely approaches the temperature which it is desired to keep up in room A. At this temperature the air, not having absorbed any water vapor in heat-exchanger B, is no longer saturated and has the requisite degree of moisture which, like its temperature, is dependent on the amount of heat yielded thereto by the spent air, in the heat-exchanger B.

In order that the temperature of the air entering room A shall remain substantially constant, I proportion the rate of flow of the air to the rate of heating of the air within said room. To that end a suitable controlling means, herein shown in the form of louvres 7, is arranged at the inlet to the room A so as to control the section of the inlet opening in relation to the temperature of the air leaving the chamber A. As the outgoing air enters the conduit 1, it acts on a thermostatic device comprising a bellows 8 containing a volatile ether, the vapors of which tend to inflate the bellows against the action of a spring or of a weight 9. If the air leaving chamber A has reached a temperature in excess of a predetermined temperature, the bellows is expanded and its movable end acts on the louvres 7 to open same, by the medium of links 10. The resista ce to the air flow being decreased, the rate ᴏ_ flow increases and restores normal temperature in the room A. The thermostat of course operates in the reverse direction if only little heat is absorbed by the air in chamber A.

If it is desired still further to decrease the difference between the temperature of the air entering the room A and the temperature which is to be kept up in said room, I may arrange within the room A a pipe 11 closed upon itself, made of heat conducting material, containing a preferably unfreezing liquid. This pipe 11 extends near the parts of the room where heat is most likely to find its way in, for example near the door 12, and from there it leads to the inlet 13 for the conditioned air, where the pipe 11 is provided with fins 14 to increase its exposed surface. The incoming air flows around the pipe 11 and absorbs some of the heat that has been carried by the liquid from the overheated part of room A, whereby the temperature within said chamber is rendered more uniform.

As stated above, it is essential also to keep constant the temperature of the cold source C whatever be the amount of heat it has to absorb, this temperature having been predetermined in relation to the conditions, particularly the hygrometric degree, to be kept up in chamber A. This result is obtained in the following manner:

The refrigerant liquid flowing through the tubes 2 absorbs the heat brought from room A by the spent air, and it vaporizes. The vapors escaping through a pipe 15 are successively collected in a container 16, sucked and compressed by a compressor 17 driven by a motor 18, and condensed at 19, whence the liquid, collected in a container 20, is brought back to the tubes 2 by a pipe 21 fitted with an expansion valve 22. In the pipe 15 is interposed a pressure stabilizer 23 comprising a weighted slide valve 24 actuated by the movable end of a bellows 25 controlled by a weight 26, a spring or the like. This spring or weight is adjustable, to allow of initially adjusting the pressure to be maintained in the tubular bundle 2 which forms the evaporator of the cold source, and consequently to determine the temperature which is to be maintained at C in each particular case.

Under the control of the bellows 25 subjected to the pressure of the vapors evolved in the tubes 2, the valve 24 connects said tubes through the pipe 15 with the container 16 as soon as the said pressure reaches beyond the predetermined pressure, i. e., as soon as the temperature of the cold source tends to rise under the influence of the heat brought by the spent air. If, on the other hand, the spent air only carries little heat, the vaporization of the liquid slows down, the bellows 25 sinks and the valve 24 closes.

The pressure in the container 16 is constantly maintained below the pressure of the vapors at 2, by the suction of the compressor 17, the operation of which is controlled by a manometric contactor 27, which breaks the circuit of electric motor 18 or closes said circuit according as the pressure in container 16 is below or above a predetermined pressure. Under these conditions, when the valve 24 is open the vapors of the refrigerant liquid always find an outlet towards the container 16 and the operation is such that the temperature of the cold source C is kept stationary despite any variation in the amount of heat brought thereto by the spent air in a given time.

Instead of being in direct contact with the spent air, the tubular bundle 2 may of course be sprayed with an unfreezing liquid through which the absorption of heat is effected, when the formation of ice is to be feared.

The following example will enable the working of the process according to my invention to be more fully understood: If it be desired to maintain in a cold storage room a temperature comprised between 4 and 5° C. with a hygrometric degree of about 70%, a temperature of −2° C. is required at the source of cold. By means of the thermostat 8 the rate of flow of the air is so adjusted that the air which has absorbed an amount of heat $q'$ in the storage room leaves said room at a temperature T' of 5° C., and carries an amount of 4.8 grams of water vapor per cubic meter of air, which at that temperature corresponds to a hygrometric degree of 70.6%. While flowing through the conduit 1, the air yields an amount of heat $q$ through the wall 5; when it reaches the cold source C its temperature has fallen to a temperature $t'$ of 1° C. As this air has kept its moisture content, its hygrometric degree has risen to 97.7%. While in contact with the tubes 2, the air yields to the cold source an amount of heat $q'$ and its temperature drops to the temperature $t$ of the cold source, which is —2° C. At this temperature, air is saturated with a moisture content of 4.2 gr. of water vapor per cubic meter. The excess vapor which was carried by the air in circulation, i. e., 4.8—4.2=0.6 gr. per cubic meter, therefore is condensed out of the air and separated. The air at —2° C. then flows back towards the storage room A, through the conduit 4 in which it absorbs the amount of heat $q$ given up by the spent air in conduit 1 through the wall 5, so that the incoming air reaches the chamber A at a temperature T of 3° C. As the amount of moisture in the incoming air has not varied while its temperature increased, the hygrometric degree of the air at the inlet of chamber A has dropped to 70%. Thus the air introduced into the storage chamber has both the requisite temperature and the requisite hygrometric degree. It has been assumed that the air absorbs in the room A, from the goods stored therein, an amount of water vapor which brings its moisture content to 4.8 gr. per cubic meter. If the amount of heat or of moisture absorbed, or both, vary for any cause, the vaporization of the refrigerant liquid is automatically varied accordingly and the hygrometric degree of the air sent to the cold storage room is brought back to the desired value.

Although in the foregoing air only has been mentioned as being the fluid circulating in the room where conditioning is required, any other suitable gas may of course be employed. It also is not always necessary to circulate the whole amount of air or other gas filling the chamber, as it might be possible to treat only a part of this gas and lower its temperature and its hygrometric degree to such an extent that its mixture with untreated gas has the desired temperature and hygrometric degree.

Instead of circulating in a closed circuit, the air may be taken from the atmosphere, as in the example shown in Fig. 2 which diagrammatically illustrates a plant for conditioning the air in a hall.

In Fig. 2, A is the hall or room to be ventilated, C is the source of cold and B is the heat exchanger which, in this case, is extended beyond the cold source. The spent air is withdrawn from A and led to the atmosphere through the conduit 1 of heat exchanger B and the extension 1' of said conduit, while fresh air from the atmosphere is led to the room A through the extension 4', the cold source C and the conduit 4. The cold source is at a predetermined temperature, which is lower than that to be maintained in the room A but may, in winter for example, be higher than the atmospheric temperature. At C the moisture content of the air is limited to the desired maximum value, any excess water vapor being separated by condensation. If however the hygrometric degree to be kept up in the room A is higher than that of the outside air, the incoming air at C is brought into contact with water, in any suitable way, in sufficient amount to produce its saturation at the temperature of C.

On its way from C to A in conduit 4 the incoming air is heated at the expense of the spent air coming from A through conduit 1. The extensions 1' and 4' of conduits 1 and 4 are also separated by a heat conducting wall 5', and they contribute in conditioning the fresh air taken from the atmosphere: According as it is warmer or cooler than the spent air in conduit 1', the atmospheric air in conduit 4' is subjected to a preliminary cooling or heating which brings it to a temperature near that of the cold source C. After flowing in contact with C and through conduit 4, the fresh air reaches room A at a substantially uniform temperature, and with a predetermined hygrometric degree.

The circulation of the air is kept up by the fan 6, placed at a suitable point. It is understood that controlling means similar or equivalent to those described with reference to Fig. 1 may be used in the plant shown in Fig. 2 in order to keep a strictly constant temperature and hygrometric degree in room A. Constructional changes may however be made in the apparatus described without departing from the scope of the invention as defined in the appended claims.

I claim:

1. A process of conditioning air to be used in a room, comprising bringing the air to be conditioned into contact with a cold source to render the temperature of said air substantially equal to the temperature of said cold source, keeping the temperature of said air substantially equal a degree predetermined in relation to the hygrometric degree to be obtained in said room, causing the air to be saturated with water vapor at said cold source temperature, leading the said air from said cold source to said room, withdrawing spent air from said room at the same rate the conditioned air is led to said room, maintaining a contracurrent heat exchange between the air flowing to said room and the air flowing from said room, controlling the rate of flow of said incoming air in accordance with the temperature of the air withdrawn from said room to avoid substantial temperature fluctuations, thus keeping substantially constant the initial temperatures of both currents of air subjected to mutual heat exchange.

2. A process of conditioning air to be used in a room, more particularly in a cold storage room, comprising withdrawing spent air from the room, circulating said air through a closed circuit and back into said room, said circuit including a cold source remote from said room, causing the spent air to flow in contact with said cold source, bringing the spent air temperature down substantially to the cold source temperature, causing the air at the cold source temperature to be saturated with water vapor, controlling the heat absorbing capacity of said cold source in accordance with the amount of heat and water vapor absorbed in said room by said spent air by keeping said cold source at a constant temperature, maintaining a contra-current heat exchange between the air on its way from said room to said cold source and the air on its way from said cold source to said room, controlling the rate of flow of the air in said closed circuit to control the rate of heat exchange in accordance with the temperature of the spent air leaving said room, thus keeping substantially constant the initial temperatures of both currents of air subjected to mutual heat exchange.

3. A process of conditioning air to be used in a room, comprising drawing from the atmosphere fresh air to be conditioned, bringing said fresh air in contact with a source of cold, keeping the temperature of said cold source constant at a degree predetermined in relation to the hygrometric degree to be obtained in said room, causing the air to be saturated with water vapor at said cold source temperature, withdrawing spent air from said room, maintaining a contra-current heat exchange between said fresh air flowing from said cold source towards said room and said spent air flowing from said room thus cooling said spent air to a temperature approaching the temperature of said cold source, discharging said cooled spent air to the atmosphere whilst leading it in contra-current heat exchange relation with said fresh air flowing from the atmosphere to said cold source, thus causing said fresh air to be successively brought by a first heat exchange to a temperature approaching that of said source, then by contact with said cold source to said cold source temperature and finally by a second heat exchange to the requisite temperature and degree of moisture.

4. A process of conditioning air to be used in a room, comprising bringing the air to be conditioned into contact with a source of cold to render the temperature of said air substantially equal to the temperature of said cold source, keeping the temperature of said cold source constant at a degree predetermined in accordance with the hygrometric degree to be obtained in said room, causing the air to be saturated with water vapor at said temperature, leading the air from said cold source to said room, subjecting the air to a heat exchange before it enters the said room by leading it in heat exchange relation with a liquid circulating within said room, allowing said air to absorb heat and moisture in said room, leading the spent air away from said room, keeping up a heat exchange in contra-current relation between the incoming air on its way from said cold source to said room and the spent air on its way from said room, to cause said spent air to transfer to said incoming air all the heat it yields as it cools down from the temperature in said room to the temperature of said cold source, and controlling the circulation of said incoming air in accordance with the temperature in said room, whereby the temperature and the hygrometric degree of the air in said room are kept substantially constant.

CAMILLE ERNEST WAUTELET.